United States Patent
Ushiku

(10) Patent No.: US 8,578,071 B2
(45) Date of Patent: Nov. 5, 2013

(54) INFORMATION PROCESSING APPARATUS AND INTER-PROCESSOR COMMUNICATION CONTROL METHOD

(75) Inventor: Toru Ushiku, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 230 days.

(21) Appl. No.: 13/243,855

(22) Filed: Sep. 23, 2011

(65) Prior Publication Data

US 2012/0079141 A1 Mar. 29, 2012

(30) Foreign Application Priority Data

Sep. 29, 2010 (JP) .................................. 2010-219520

(51) Int. Cl.
*G06F 3/00* (2006.01)
*G06F 13/28* (2006.01)

(52) U.S. Cl.
USPC .......... 710/26; 710/1; 710/8; 710/10; 710/15; 710/22

(58) Field of Classification Search
USPC .................. 710/1, 8, 10, 15, 22, 26
See application file for complete search history.

(56) References Cited

U.S. PATENT DOCUMENTS

| | | | | |
|---|---|---|---|---|
| 7,421,524 B2* | 9/2008 | Huppenthal et al. | ............ | 710/72 |
| 7,552,254 B1* | 6/2009 | George et al. | ................... | 710/58 |
| 7,552,255 B1* | 6/2009 | George et al. | ................... | 710/58 |
| 7,571,284 B1* | 8/2009 | Olson et al. | .................... | 711/122 |
| 7,581,042 B2* | 8/2009 | Minturn et al. | .................. | 710/52 |
| 7,797,691 B2* | 9/2010 | Cockx et al. | .................. | 717/155 |
| 8,073,974 B2* | 12/2011 | Rapp et al. | ..................... | 709/247 |
| 2006/0143333 A1* | 6/2006 | Minturn et al. | ................. | 710/52 |

FOREIGN PATENT DOCUMENTS

JP 6-348644 A 12/1994
JP 2001-256200 A 9/2001

* cited by examiner

*Primary Examiner* — Idriss N Alrobaye
*Assistant Examiner* — Getente A Yimer
(74) *Attorney, Agent, or Firm* — Canon U.S.A., Inc. IP Division

(57) ABSTRACT

An information processing apparatus includes a plurality of processors configured to form a pipeline, a plurality of communication units configured to transfer communication data between a processor in an upstream stage of the pipeline and another processor in a downstream stage and to temporarily store the communication data output from the processor in the upstream stage to the processor in the downstream stage into an internal FIFO buffer, and a memory configured to be accessible from each of the processors and each of the communication units.

2 Claims, 14 Drawing Sheets

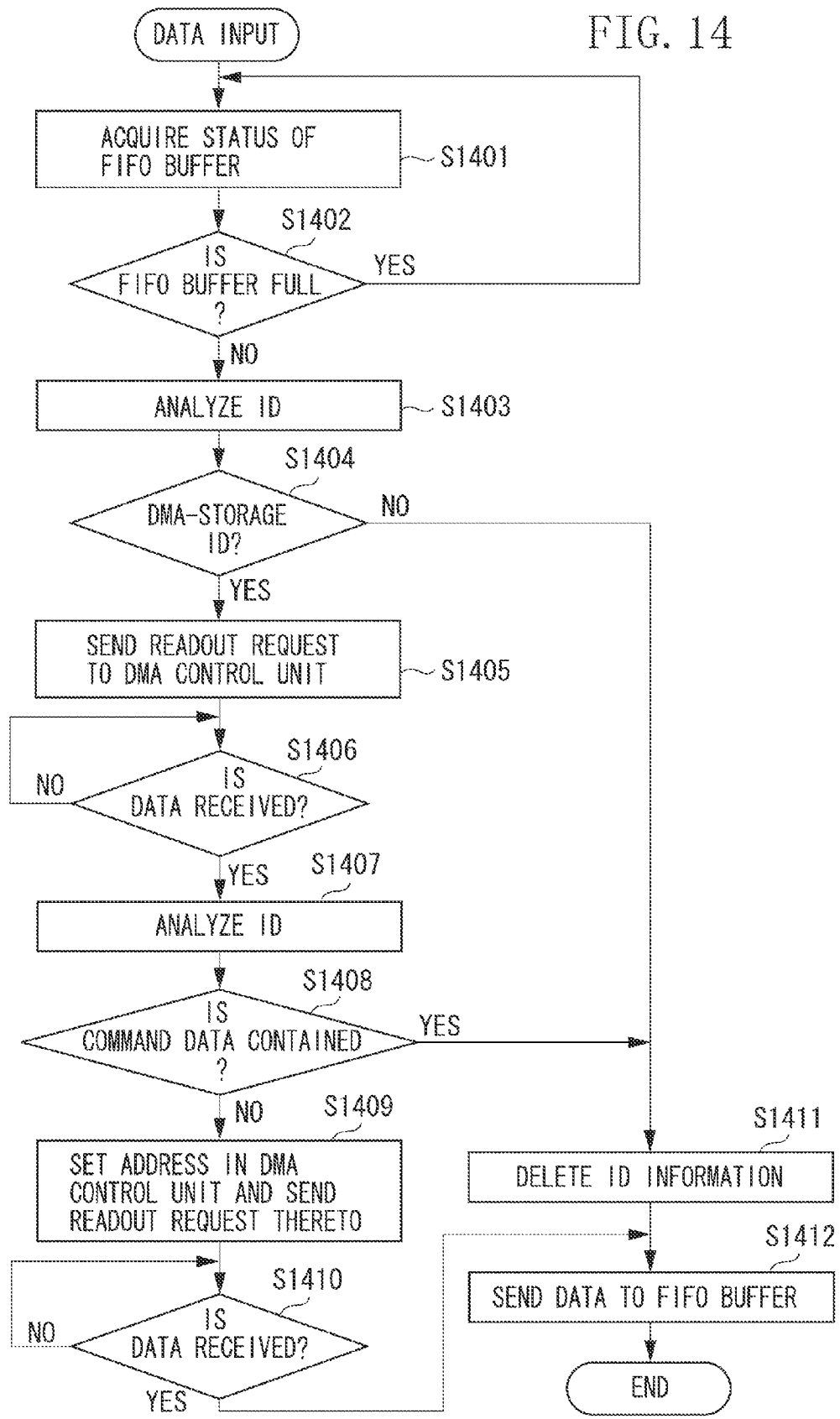

INFORMATION PROCESSING APPARATUS AND INTER-PROCESSOR COMMUNICATION CONTROL METHOD

BACKGROUND OF THE INVENTION

1. Field of the Invention

The present invention relates to an information processing apparatus containing a pipeline structure constituted of a multiprocessor system including first-in first-out (FIFO) buffers, each of the buffers being arranged between one processor and another processor thereof, and to an inter-processor communication control method.

2. Description of the Related Art

Recently, raster image processing methods for a color image processing apparatus have become more and more complicated. As a unit which executes a complicated algorithm rapidly with a high quality secured, a system including a pipeline system realized with multiprocessors has been proposed.

In the case of constructing the multiprocessors into a pipeline system, a method which accelerates memory access by disposing each of FIFO buffers between one processor and another one has been known.

A time required for sending a command to an FIFO buffer varies depending on processing time of each processor. If a difference of the time required for sending the command between processors is too large, an FIFO buffer located between one processor and another becomes full of stored data, so that the processor stalls, disabling sending of data. On the other hand, if a processor located in the downstream stage ends its processing too early, the processor cannot receive a command from a processor located in the upstream stage, so that it stalls. Although, to cope with these problems, the capacity of the FIFO buffer may be adjusted into an appropriate size through an operating analysis using a tremendous amount of data at the time of system design, a tremendous amount of work must be done for the operating analysis.

To achieve the pipeline system for the multiprocessors to meet these factors, it is necessary to eliminate a stall of the processor originating from a full storage of the buffer. Japanese Patent Application Laid-Open No. 2001-256200 discusses a method for a system including the FIFO buffer connecting the pipeline and a shared memory having a large latency, the method intending to detect that the FIFO buffer is full and to cause a processor in the upstream stage to transfer a command to the shared memory so that another processor in the downstream stage can access the shared memory to read out the command from the memory.

Japanese Patent Application Laid-Open No. 6-348644 discusses another method which, in direct memory access (DMA) control not through any processor (central processing unit (CPU)), processes data transmission in a short time by deleting data not necessary to transfer.

However, according to the data transfer technology discussed in Japanese Patent Application Laid-Open No. 2001-256200, the processor in the downstream stage needs to access a memory with a large latency to which the command has been transferred, and consequently, the effect of arranging the FIFO buffer between the processors drops remarkably.

Further, according to the DMA control technology discussed in Japanese Patent Application Laid-Open No. 6-348644, it is necessary to compare the content of the transfer data with the data which is preliminarily set and not required to transfer, and consequently, the DMA control unit cannot be constructed at a low cost.

SUMMARY OF THE INVENTION

The present invention is directed to a method for realizing low-cost, high-efficiency inter-processor data transfer with multiprocessors connected via a pipeline.

According to an aspect of the present invention, an information processing apparatus includes: a plurality of processors configured to form a pipeline; a plurality of communication units configured to transfer communication data between a processor in an upstream stage of the pipeline and a processor in a downstream stage and to temporarily store the communication data output from the processor in the upstream stage to the processor in the downstream stage into an internal FIFO buffer; and a memory configured to be accessible from each of the processors and each of the communication units, wherein each of the processors includes a generation unit configured to output, when sending a command to the processor in the downstream stage, communication data including an address of data which exists on the memory and was used for generation of the command, and identification information indicating whether the command exists at the address within the memory, wherein each of the communication units includes: a DMA control unit configured to control a DMA access to the memory; an input unit configured to execute input processing of analyzing the identification information in the communication data input from the processor in the upstream stage and, if it is determined that the command in the communication data does not exist in the memory, deleting the address from the communication data, and, if it is determined that the command in the communication data exists in the memory, deleting the command from the communication data and sending the communication data without the address or the command to the DMA control unit to transfer the communication data to the memory; and an output control unit configured to execute output processing of, when an empty space occurs in the buffer, acquiring the communication data DMA-transferred to the memory from the memory by the DMA control unit, analyzing the acquired identification information in the communication data, and, if it is determined that a command is contained in the communication data, outputting the command in the communication data to the buffer and, if it is determined that an address is contained in the communication data, acquiring the command from the memory by the DMA control unit using the address in the communication data to output the acquired command to the buffer.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 14 is a flowchart illustrating an example of an output control unit according to the second exemplary embodiment.

DESCRIPTION OF THE EMBODIMENTS

Various exemplary embodiments, features, and aspects of the invention will be described in detail below with reference to the drawings.

According to an exemplary embodiment of the present invention, as an image processing apparatus which is an example of an information processing apparatus, a digital multifunction peripheral (MFP) containing multiple functions for scanning, printing, copying and the like will be described.

Figure 1:
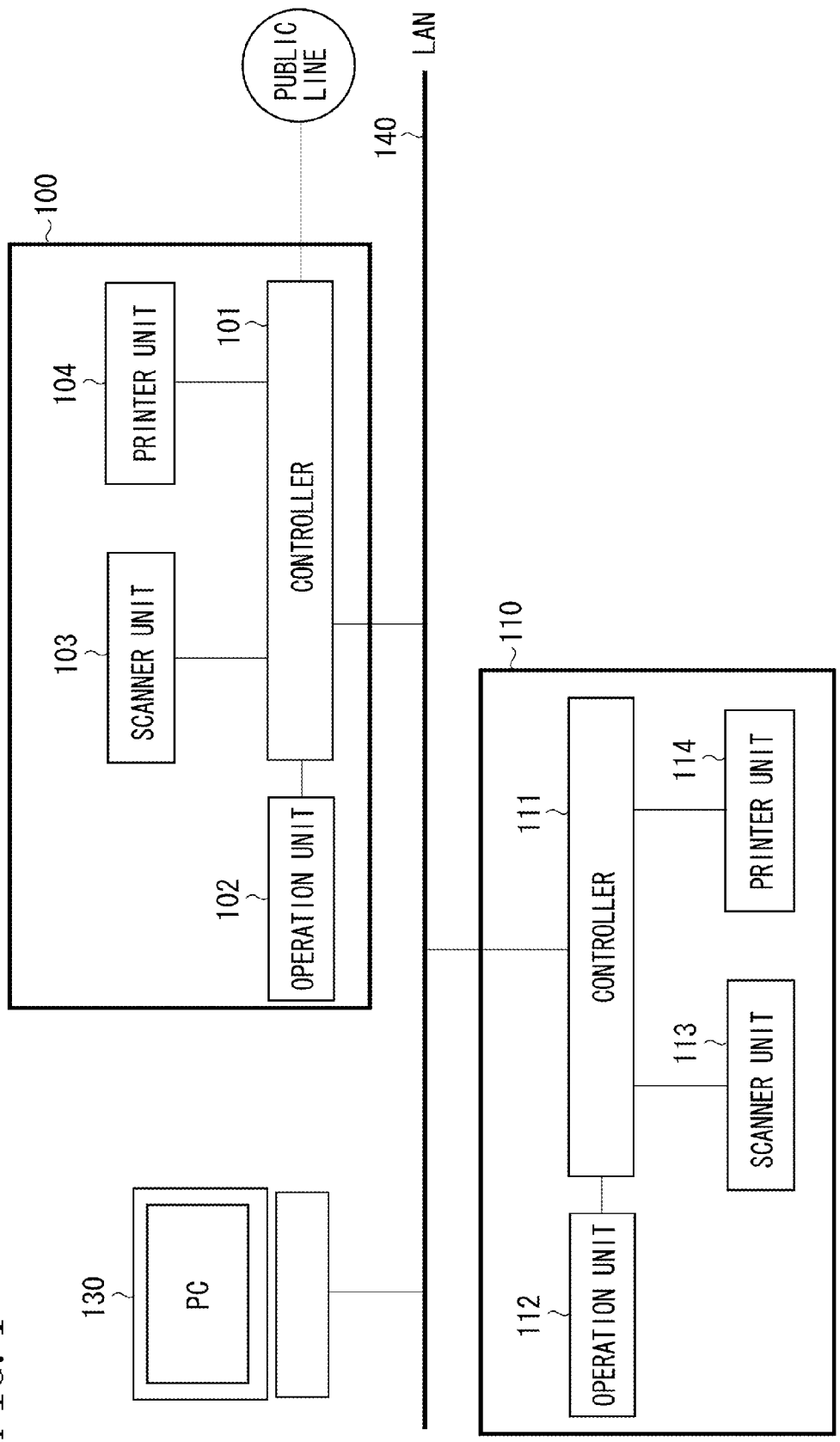
FIG. 1 is a block diagram illustrating an example of the configuration of an image processing system which can adopt an image processing apparatus according to an exemplary embodiment of the present invention.

FIG. 1 is a block diagram illustrating an example of the configuration of an image processing apparatus according to an exemplary embodiment of the present invention. Although in this system, a host computer 130 and two image processing apparatuses 100 and 110 are connected to a local area network (LAN) 140, in the image processing system of the present invention, the number of connected devices in the image processing system of the present invention is not limited to this connection number. Further, although this exemplary embodiment adopts LAN as a connecting method, the present invention is not restricted to this method. For example, an arbitrary network such as wide area network (WAN: public line), serial transmission system such as USB, and parallel transmission system such as Centronics, SCSI are available also.

The host computer (hereinafter referred to as PC) 130 has a function of a personal computer. The PC 130 can send and receive a file or an electronic mail using a file transfer protocol (FTP) or SMB protocol via the LAN 140 or WAN. Further, the PC 130 can send a print command to the image processing apparatuses 100 and 110 via a printer driver.

The image processing apparatuses 100 and 110 have the same configuration with a scanner unit. Hereinafter, the configuration of the image processing apparatuses 100 and 110 will be described in detail particularly by paying attention to the image processing apparatus 110 for simplicity of the description.

The image processing apparatus 110 includes a scanner unit 113 which is an image input device, a printer unit 114 which is an image output device, a controller 111 which controls an entire operation of the image processing apparatus 110, and an operation unit 112 which is a user interface (UI).

Figure 2:
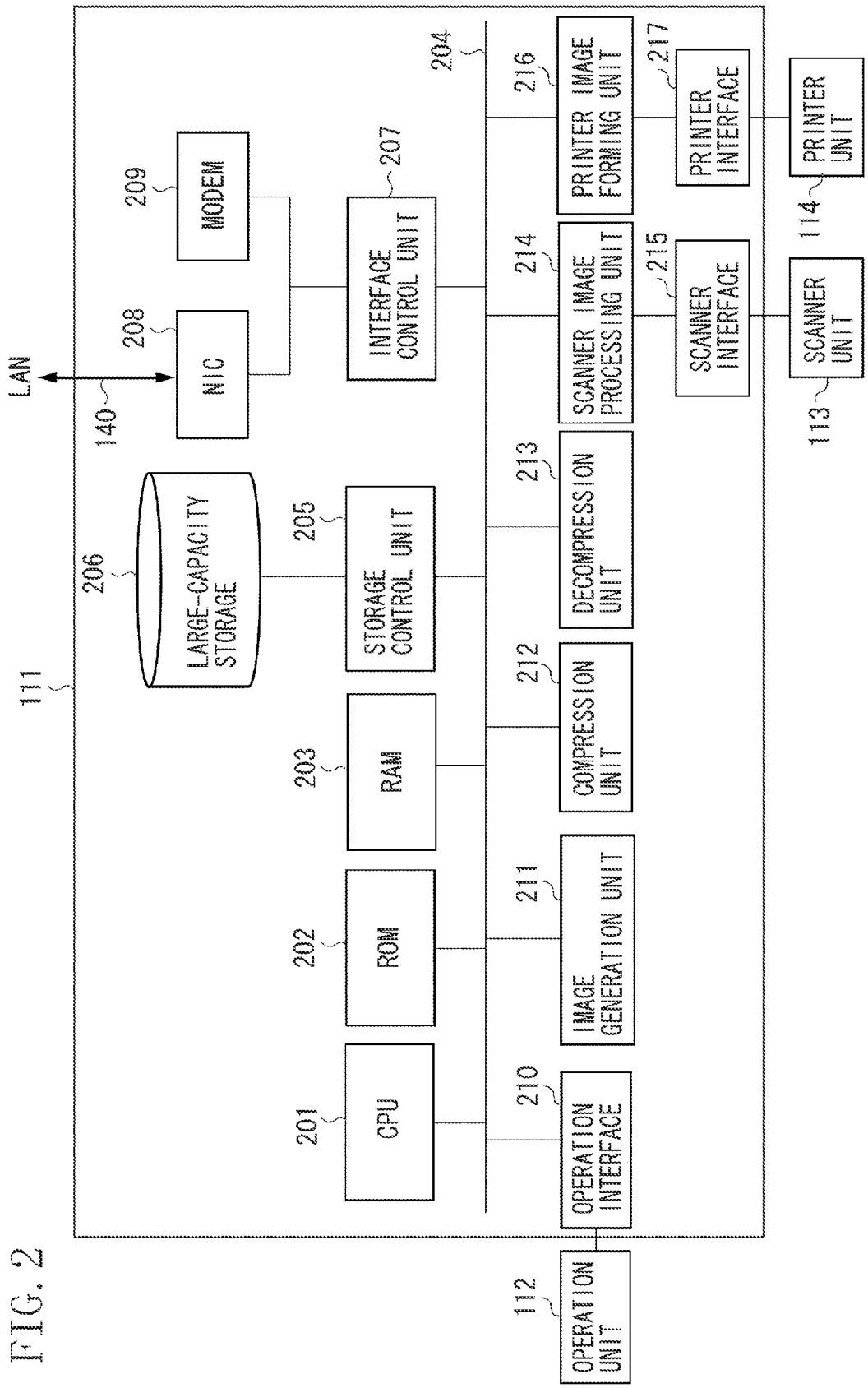
FIG. 2 is a block diagram illustrating the configuration of a controller of the image processing apparatus illustrated in FIG. 1.

FIG. 2 is a block diagram illustrating the configuration of the controller 111 of the image processing apparatus 110 illustrated in FIG. 1. The CPU 201 is a controller for controlling the entire image processing apparatus 110. The CPU 201 starts an operating system (OS) with a boot program stored in a read-only memory (ROM) 202. The CPU 201 executes a control program and a variety of application programs stored in a large-capacity storage 206 on this OS. The CPU 201 is connected to other units via an internal bus, for example, a data bus 204.

A random access memory (RAM) 203 operates as a temporary storage area for a main memory of the CPU 201 or work area. Further, the RAM 203 is used as a temporary storage area for image processing also. Hereinafter, the RAM 203 is called a system memory 203 in another word.

A storage control unit 205 controls data readout from the large-capacity storage 206 and data write to the large-capacity storage 206. An interface control unit 207 controls a network interface, for example, a network interface card (NIC) 208, to send and receive data such as image data via a network such as the LAN 140. Further, the interface control unit 207 controls a modem 209 to send and receive data via telephone line.

An operation interface 210 inputs a user's operation instruction through an input unit (touch panel, hard key or the like) of the operation unit 112. Further, the operation interface 210 controls an output unit (LCD, CRT or the like) of the operation unit 112 to display an operation screen for user.

Figure 4:
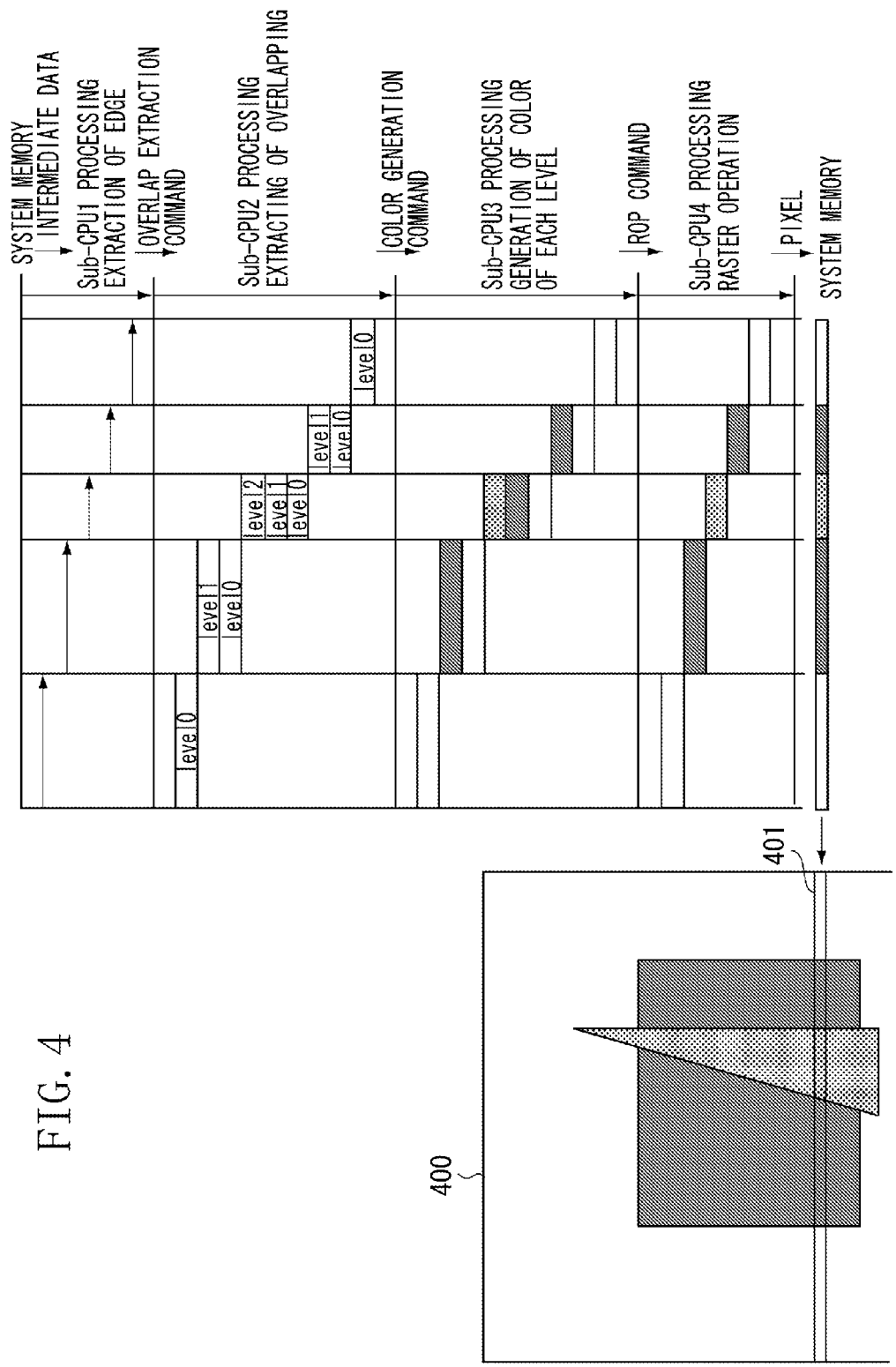
FIG. 4 is a diagram illustrating an operating scheme of the image generating unit illustrated in FIG. 3.

Based on data received via an interface control unit 207, an image generation unit 211 generates bitmap data which a printer unit 114 can process and its attribute data (represented in FIG. 4 in detail).

A compression unit 212 compresses the bitmap data and the attribute data. A decompression unit 213 decompresses the data compressed by the compression unit 212 to generate the bitmap data and the attribute data.

A scanner image processing unit 214 corrects, processes, and edits the bitmap data received from the scanner unit 113 via a scanner interface 215. The scanner image processing unit 214 determines whether the received bitmap data is of color document or monochrome document and of text document or photographic document and accompanies the image data with its determination result as attribute data. A printer image forming unit 216 executes image processing for a printer and sends the aforementioned bitmap data to the printer unit 114 via a printer interface 217.

Figure 3:
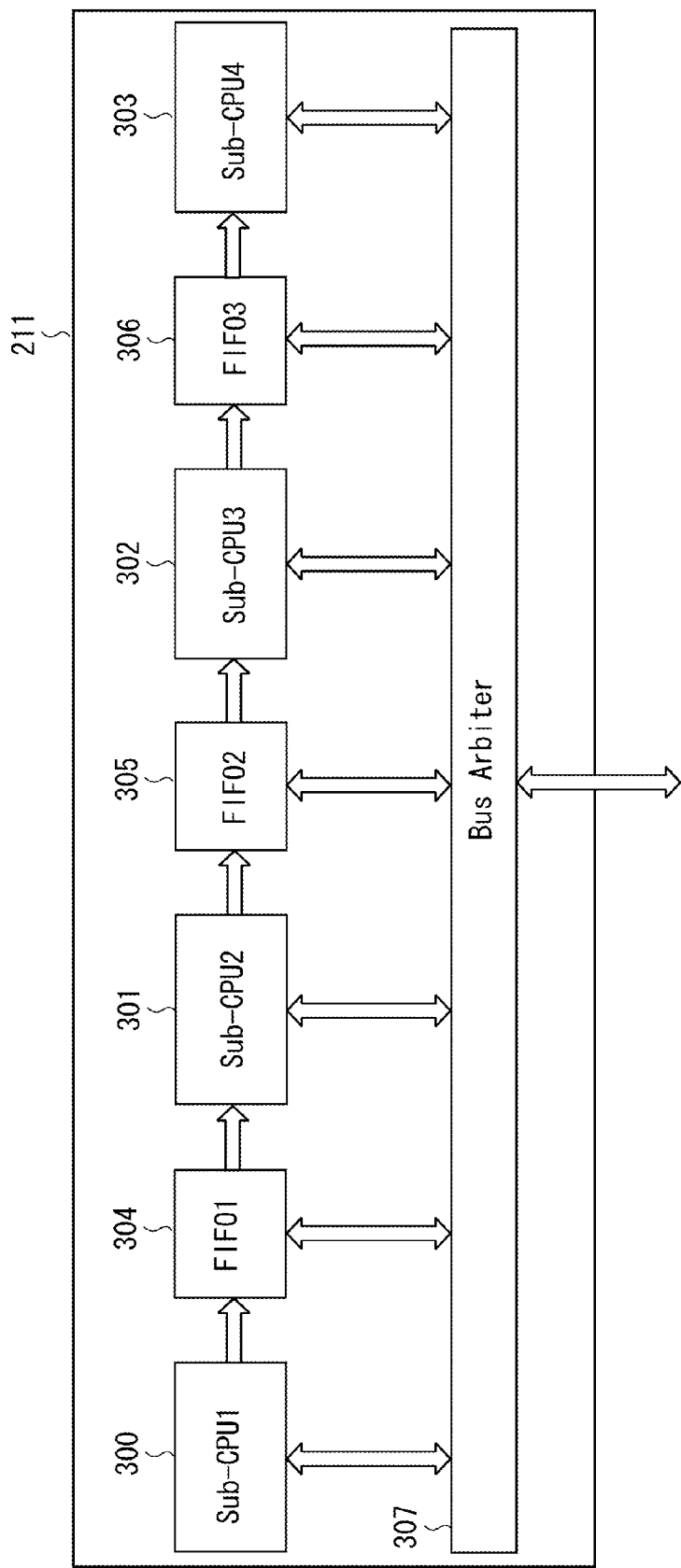
FIG. 3 is a block diagram illustrating the configuration of an image generating unit illustrated in FIG. 2.

FIG. 3 is a block diagram illustrating the configuration of the image generation unit 211 illustrated in FIG. 2. As illustrated in FIG. 3, the image generation unit 211 includes a plurality of processors which constitutes a pipeline. In the example illustrated in FIG. 3, the image generation unit 211 includes four sub-CPUs, i.e., a sub-CPU1 300, a sub-CPU2 301, a sub-CPU3 302, and a sub-CPU4 303.

The sub-CPU1 300 and the sub-CPU2 301 are connected with each other by a DMA FIFO1 304. The sub-CPU2 301 and the sub-CPU3 302 are connected with each other by a DMA FIFO2 305. Further, the sub-CPU3 302 and the sub-CPU4 303 are connected with each other by a DMA FIFO3 306. These DMA FIFOs function as communication units which transfer communication data between the processors and temporarily store the communication data output from the sub-CPU in the upstream stage to the sub-CPU in the downstream stage in the pipeline into each internal FIFO buffer.

The sub-CPU1 300, the sub-CPU2 301, the sub-CPU3 302, the sub-CPU4 303, the DMA FIFO1 304, the DMA FIFO2 305, and the DMA FIFO3 306 are so configured to allow input/output to/from a data bus 204. Access from these blocks is connected to the data bus 204 through arbitration by a bus arbiter 307. These sub-CPUs and DMA FIFOs can access the system memory 203 via the bus arbiter 307 and the data bus 204.

The sub-CPU1 300, the sub-CPU2 301, the sub-CPU3 302, and the sub-CPU4 303 execute each processing by executing firmware stored in the system memory 203.

FIG. 4 is a diagram illustrating an operating scheme of the image generation unit 211 illustrated in FIG. 3. The image generation unit 211 generates images by scanning with successive main scanning lines step by step for the printer unit 114 using intermediate data (display list) stored in the system memory 203. First, the sub-CPU1 300 reads out the display list (drawing command group) from the system memory 203 and executes processing for extracting an edge from object information of data to be used for the image generation contained in the display list. Further, the sub-CPU1 300 generates an overlap extraction command and sends the overlap extraction command to the sub-CPU2 301 via the DMA FIFO1 304.

Next, the sub-CPU2 301 extracts an overlap using the received overlap extraction command. In FIG. 4, an overlap between edges extracted by the sub-CPU1 300 is indicated as a level. Level0 indicates an object located on the background and a higher number of the level indicates an object located more forward with respect to the background, following an order of level0, level1 and level2. In the example illustrated in FIG. 4, level2 indicates an object located most forward.

The sub-CPU2 301 generates a color generation command according to the extracted overlap information and sends the color generation command to the sub-CPU3 302 via a DMA FIFO2 305.

Next, the sub-CPU3 302 generates a color of each level with the received color command. Further, the sub-CPU3 302 generates a raster operation command (ROP) and sends the ROP command to a sub-CPU4 303 via a DMA FIFO3 306.

The sub-CPU4 303 executes a raster operation with the received ROP command, generates pixels, and sends the generated pixels to the system memory 203. The image generation unit 211 executes the aforementioned operation for each line to generate image data 400 of a single page. The sub-CPU1 300, the sub-CPU2 301, and the sub-CPU3 302 utilize the intermediate data read out from the system memory 203 when generating the command.

Figure 5:
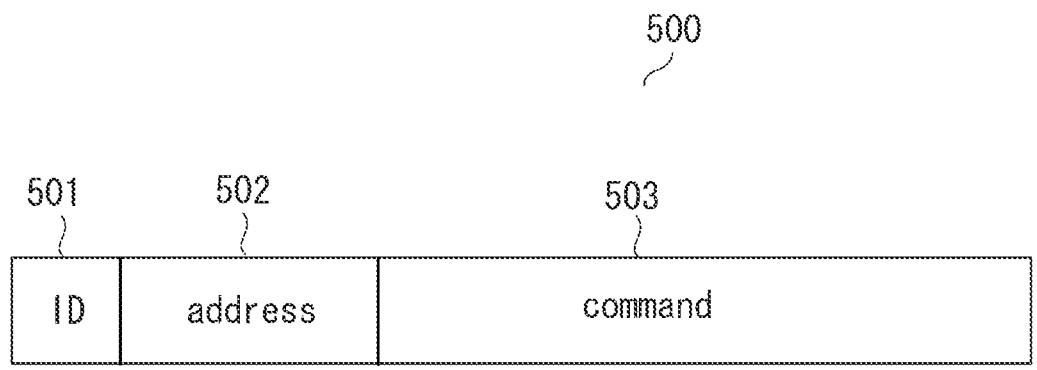
FIG. 5 is a schematic diagram illustrating a format of packet data for use in the image generating unit.

FIG. 5 is a schematic diagram illustrating a format of packet data for use in the image generation unit 211. FIG. 5 illustrates packet data 500, which is communication data transferred between processors and output from a sub-CPU in the upstream stage to a sub-CPU in the downstream stage. The packet data 500 is constituted of ID information 501, address data 502, and command data 503. The ID information 501 contains identification information indicating whether the command data 503 is stored on the system memory 203 indicated by the address data 502 (i.e., whether the command data 503 is just data read out from the system memory 203) or the command data 501 is generated by a sub-CPU which generated the packet data 500. When outputting a command from a sub-CPU in the upstream stage to a sub-CPU in the downstream stage, the upstream sub-CPU generates the command using an intermediate data read out from the system memory 203. For this purpose, in some case, the upstream sub-CPU generates the command or in other case, intermediate data read out from the system memory 203 is used just as the command. Thus, the ID information 501 is provided to enable a downstream DMA FIFO to identify which of the aforementioned commands the command belongs to. Assume that the ID information 501 contains information indicating whether the command to be sent with the packet data 500 is a final command within the main scanning line of the printer 114.

The address data 502 indicates an address (address on the memory) of intermediate data (command) stored on the system memory 203 used for generating the command data 503. The command data 503 is a command for the sub-CPU in the downstream stage.

Figure 6:
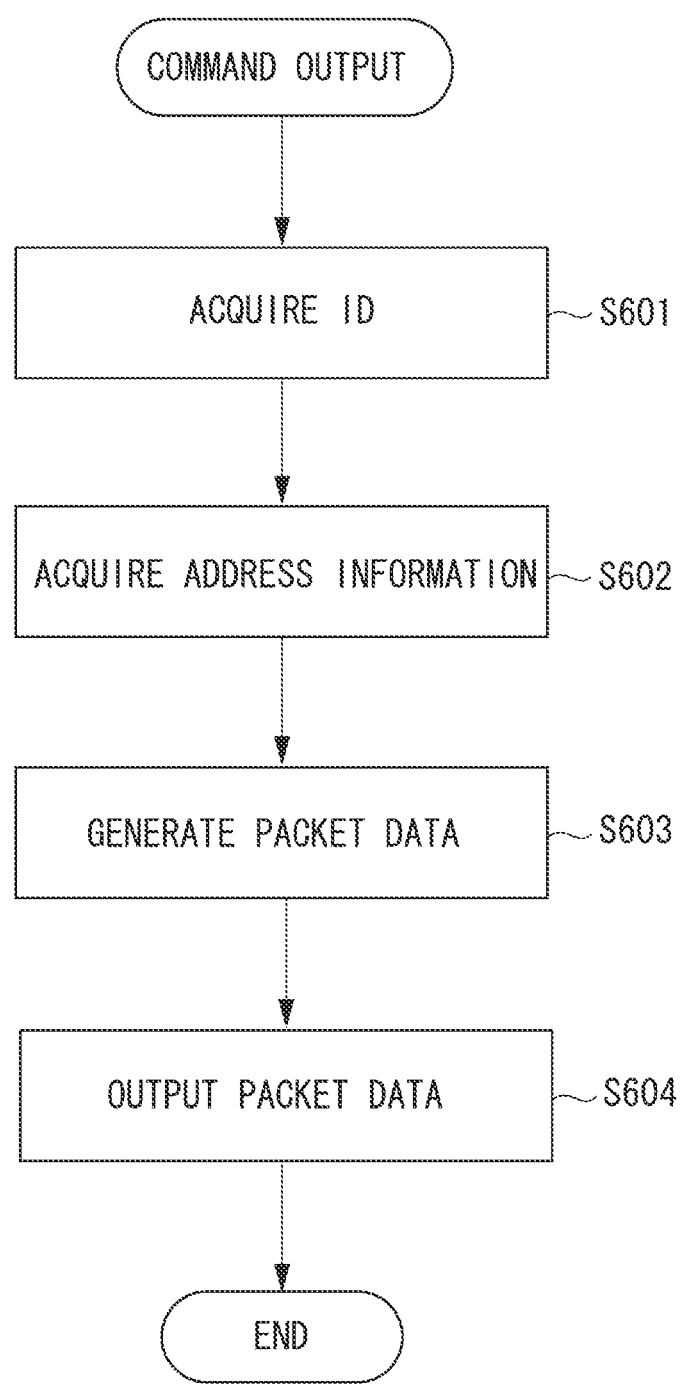
FIG. 6 is a flowchart illustrating an example of packet data generation processing to be executed by a sub-CPU.

FIG. 6 is a flowchart illustrating an example of the packet data generation processing to be executed by the sub-CPU1 300, the sub-CPU2 301, and the sub-CPU3 302. The processing of this flowchart is achieved when the sub-CPU1 300, the sub-CPU2 301, the sub-CPU3 302, and the sub-CPU4 303 read out a program stored in the system memory 203 and execute it. The sub-CPU1 300, the sub-CPU2 301, and the sub-CPU3 302 are described as a sub-CPU, and the DMA FIFO1 304, the DMA FIFO2 305, and DMA FIFO3 306 are described as a DAM FIFO.

After generating the command to be sent to the sub-CPU in the downstream stage, the sub-CPU starts generation of a packet to be sent to the sub-CPU in the downstream stage. First, in step S601, the sub-CPU allocates ID information indicating whether the command is stored in the system memory 203 (just intermediate data read out from the system memory 203) or the command was generated by the sub-CPU.

Next, in step S602, the sub-CPU acquires a storage address in the system memory 203 of the intermediate data used when generating the command. Further, in step S603, the sub-CPU generates the packet data 500 using the ID information acquired in step S601, the address acquired in step S602, and the command generated above as the ID information 501, the address data 502, and the command data 503, respectively. Finally, in step S604, the sub-CPU sends the packet data 500 generated in step S603 to the DMA FIFO in the downstream stage. As a result of the processing described above, the sub-CPU can send the packet data 500 which contains the ID information 501, the address data 502, and the command data 503 in its communication data, to the sub-CPU in the downstream stage.

Figure 7:
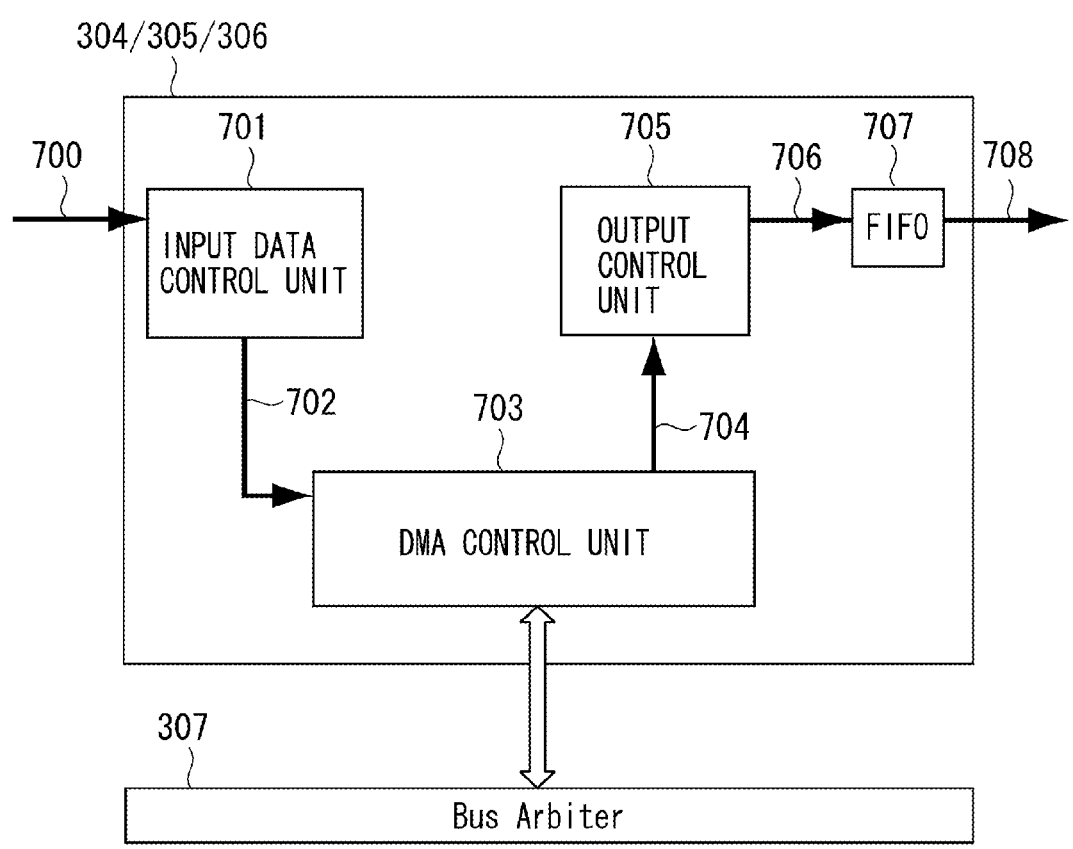
FIG. 7 is a block diagram illustrating the configuration of a DMA FIFO buffer according to a first exemplary embodiment of the present invention.

Hereinafter, the configurations of the DMA FIFO1 304, the DMA FIFO2 305, and the DMA FIFO3 306 will be described with reference to FIG. 7. FIG. 7 illustrates the DMA FIFO1 304 as a representative of the DAM FIFO buffers.

FIG. 7 is a block diagram illustrating the configuration of the DMA FIFO buffer according to a first exemplary embodiment of the present invention. An input data control unit 701 analyzes packet data received from the sub-CPU in the upstream stage via a connection 700, and transfers its result to a DMA control unit 703. The input data control unit 701 is connected to the DMA control unit 703 via a connection 702. The input processing operation of the input data control unit 701 will be described with reference to FIG. 8. The DMA control unit 703 controls a DMA access (DMA transfer) to the system memory 203. An operation of the DMA control unit 703 will be described with reference to FIGS. 9 and 11.

Figure 10:
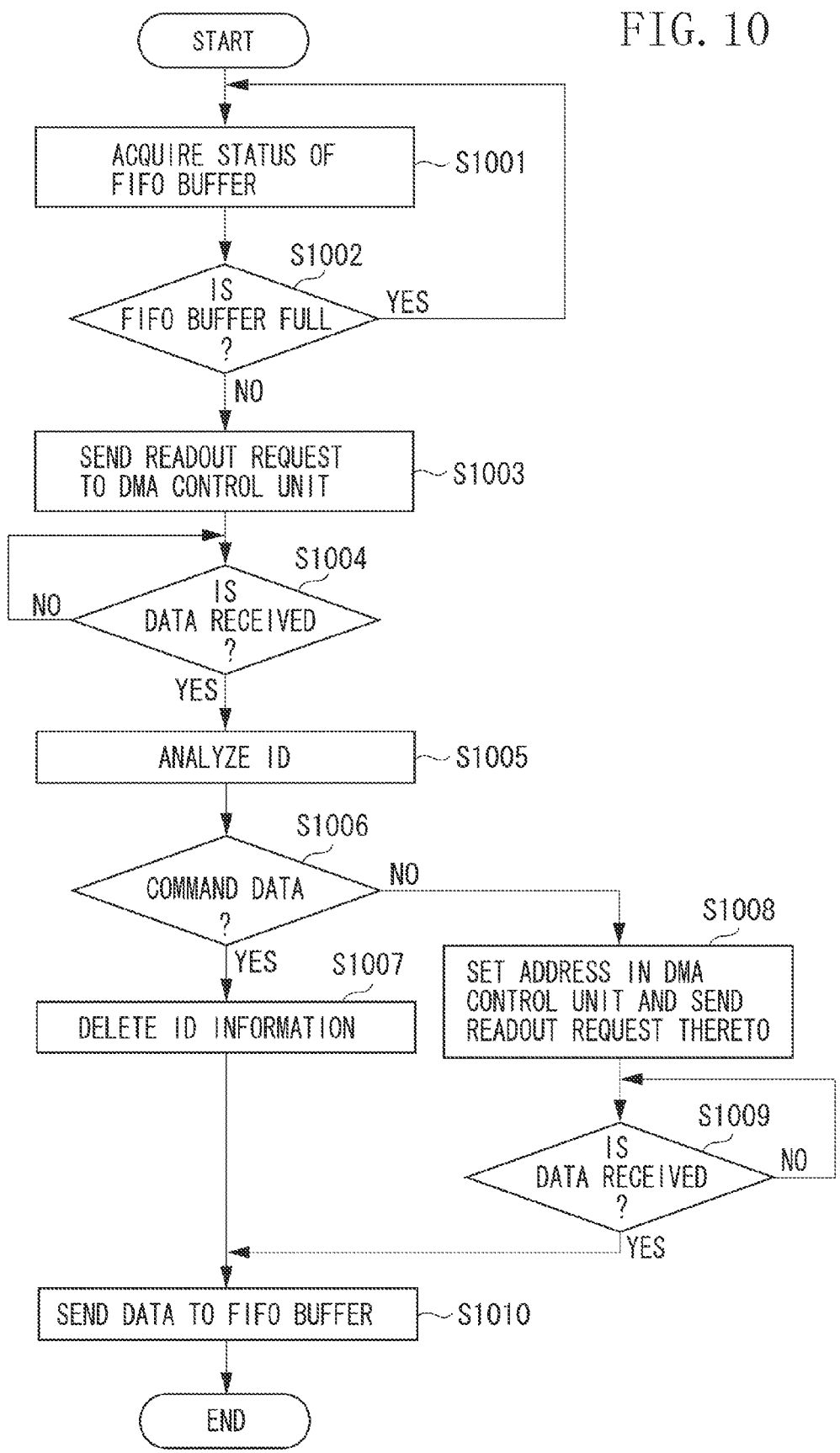
FIG. 10 is a flowchart illustrating an example of the operation of an output control unit according to the first exemplary embodiment.

The output control unit 705 is connected to the FIFO 707 via a connection 706 and to the DMA control unit 703 via a connection 704. An output processing operation of the output control unit 705 is illustrated in FIG. 10.

The FIFO 707 is a buffer which receives data from the output control unit 705 and stores the data in first-in first-out method (FIFO type) by which data received first is output first.

Figure 8:
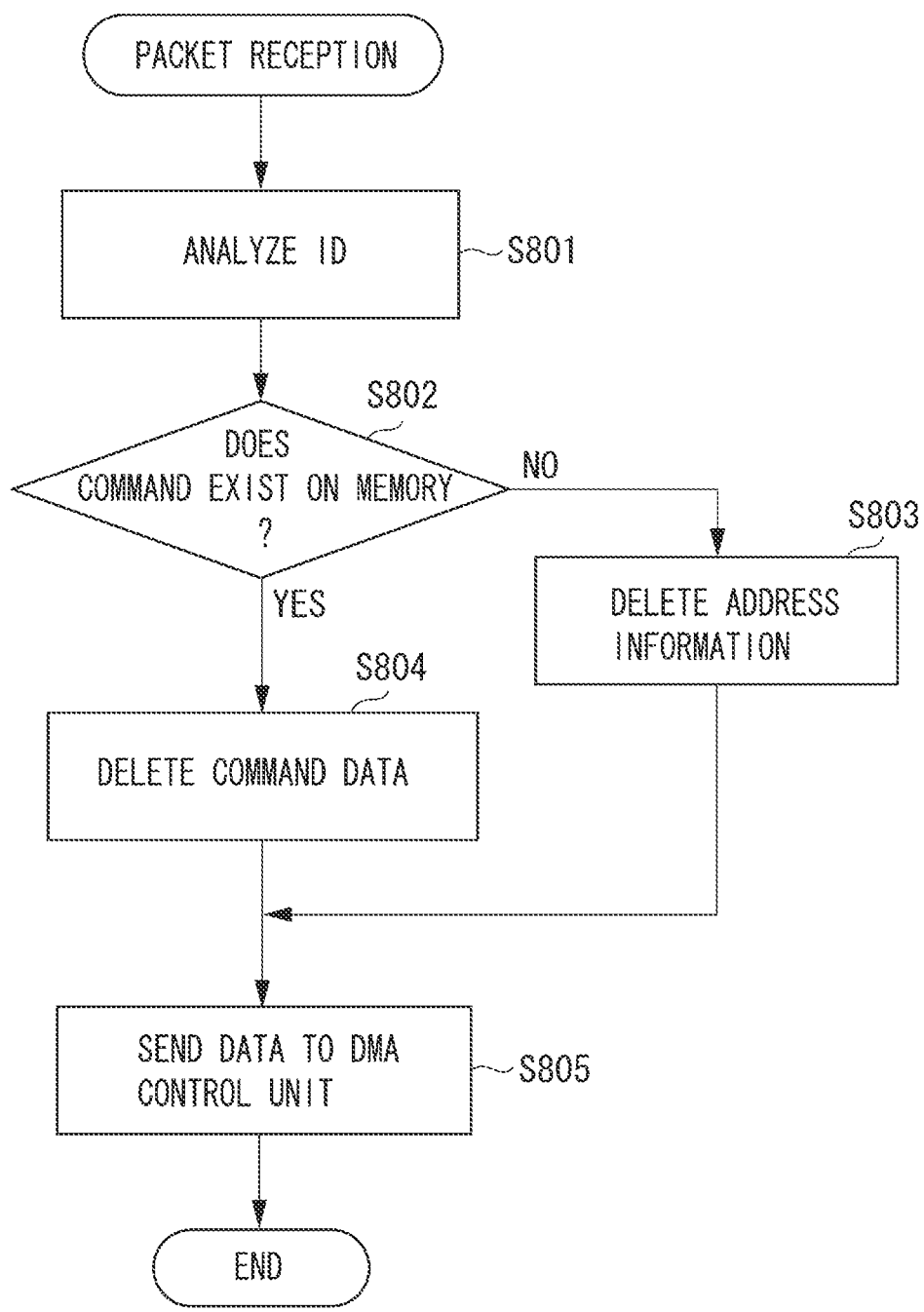
FIG. 8 is a flowchart illustrating an example of the operation of an input data control unit according to the first exemplary embodiment.

Hereinafter, an I/O operation of the DMA FIFO according to the first exemplary embodiment will be described with reference to FIGS. 8, 9, 10, and 11. First, an operation of the input data control unit 701 will be described with reference to the flowchart of FIG. 8. FIG. 8 is a flowchart illustrating an example of the operation of the input data control unit 701 according to the first exemplary embodiment. In step S801, when receiving packet data 500 from a sub-CPU in the upstream stage, the input data control unit 701 analyzes the ID information 501 in the packet data 501. In step S802, by analyzing this ID information, the input data control unit 701 determines whether the given command was generated by the sub-CPU in the upstream stage or already exists in the system memory 203 (just data read out from the system memory 203).

Then, if it is determined that the given command exists in the memory (YES in step S802), the input data control unit 701 advances the processing to step S804. In step S804, because the input data control unit 701 can use the command existing in the system memory 203, the input data control unit 701 determines that the command data 503 is not necessary and deletes the command data 503 in the packet data 500. Then, the input data control unit 701 advances the processing to step S805.

On the other hand, if it is determined that no given command exists in the memory (NO in step S802), the input data control unit 701 advances the processing to step S803. Because in step S803, the input data control unit 701 cannot use a command existing in the system memory 203 and accordingly uses the command data 503, the input data control unit 701 determines that no address data 502 is necessary and then deletes the address data 502 in the packet data 500. Then, the input data control unit 701 advances the processing to step S805. In step S805, the input data control unit 701 sends the packet data 500 to the DMA control unit 703 and terminates the processing.

Figure 9:
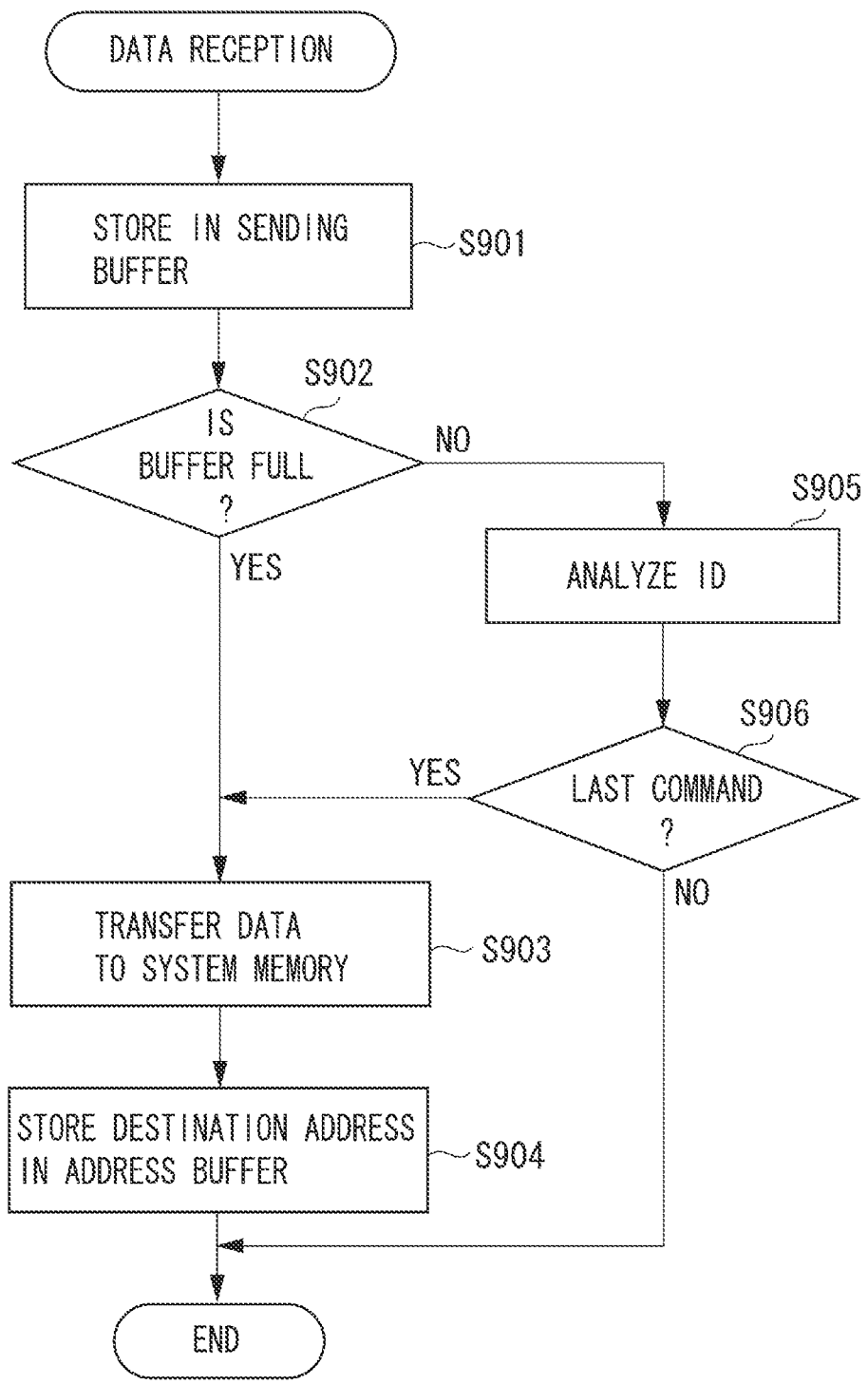
FIG. 9 is a flowchart illustrating an example of data sending operation to a system memory by the DMA control unit according to the first exemplary embodiment.

Next, a data sending operation by the DMA control unit 703 to the system memory 203 will be described using the flowchart of FIG. 9. FIG. 9 is a flowchart illustrating an example of the data sending operation to the system memory 203 by the DMA control unit 703 according to the first exemplary embodiment. In step S901, after receiving data from the input data control unit 701, the DMA control unit 703 stores the given data in a sending buffer (not illustrated) in the DMA control unit 703. Next, in step S902, the DMA control unit 703 determines whether the sending buffer is full. If it is determined that the sending buffer is full (YES in step S902), then in step S903, the DMA control unit 703 burst-transfers data in the sending buffer to the system memory 203. Further, in step S904, after the data is sent to the system memory 203 in step S903, the DMA control unit 703 stores address information in the system memory 203 in an address buffer (not illustrated) and then terminates the processing.

On the other hand, if it is determined that the sending buffer is not full (NO in step S902), then in step S905, the DMA control unit 703 analyzes the ID information 501 in the aforementioned data, and in step S906, determines whether the given data is a final command (last data of the main scanning line of the printer).

Then, if it is determined that the data is not a final command (NO in step S906), the DMA control unit 703 terminates the processing. On the other hand, if it is determined that the data is the final command (YES in step S906), then in step S903, the DMA control unit 703 transfers the data in the sending buffer to the system memory 203. Further, in step S904, the DMA control unit 703 stores the address information which was sent in step S903 and exists in the system memory 203, into the address buffer and then, terminates the processing.

Next, an operation of the output control unit 705 according to the first exemplary embodiment will be described with reference to the flowchart of FIG. 10. FIG. 10 is a flowchart illustrating an example of the operation of the output control unit 705 according to the first exemplary embodiment. In step S1001, the output control unit 705 always executes the processing of this flowchart during an activation. The output control unit 705 acquires a status of the FIFO 707. Then, in step S1002, the output control unit 705 checks the status of the FIFO 707 and if it is determined that the FIFO 707 is full (YES in step S1002), then in step S1001, the output control unit 705 acquires the status of the FIFO 707 again.

On the other hand, if it is determined that the FIFO 707 is not full (NO in step S1002), then in step S1003, the output control unit 705 sends a readout request to the DMA control unit 703. According to this request, the DMA control unit 703 sends data in the sending buffer (or data read out from the system memory 203 after the data was transferred to the system memory 203) to the output control unit 705.

Next, in step S1004, the output control unit 705 waits for data from the DMA control unit 703 to be received and if it is determined that the data from the DMA control unit 703 has been received (YES in step S1004), then in step S1005, the output control unit 705 analyzes the ID information unit 703 in the received data.

As a result of the analysis on the ID information in step S1005, in step S1006, the output control unit 705 determines whether the received data contains the command data 503. If the ID information 501 indicates that the command was generated by the sub-CPU which generated the data, the output control unit 705 determines that the data contains the command data 503. On the other hand, if the ID information 501 indicates that the command is stored in the system memory 203, the output control unit 705 determines that no data contains the command data 503.

If it is determined that the received data contains the command data 503 (YES in step S1006), then in step S1010, the output control unit 705 deletes the ID information 501 from the received data and sends the command data 503 to the FIFO 707. The output control unit 705 terminates the processing and again, starts the processing of this flowchart.

On the other hand, if it is determined that the received data contains no command data 503 (that is, contains the address data 502) (NO in step S1006), then in step S1008, the output control unit 705 sets the aforementioned address data 502 in the DMA control unit 703 and sends a readout request. According to this request, the DMA control unit 703 sends data stored at the set address in the system memory 203 to the output control unit 705.

In step S1009, the output control unit 705 waits for data from the DMA control unit 703 to be received and if it is determined that the data from the DMA control unit 703 is received (YES in step S1009), then in step S1010, the output control unit 705 sends the received data to the FIFO 707.

Then, the output control unit 705 terminates the processing and again, starts the processing of this flowchart.

Figure 11:
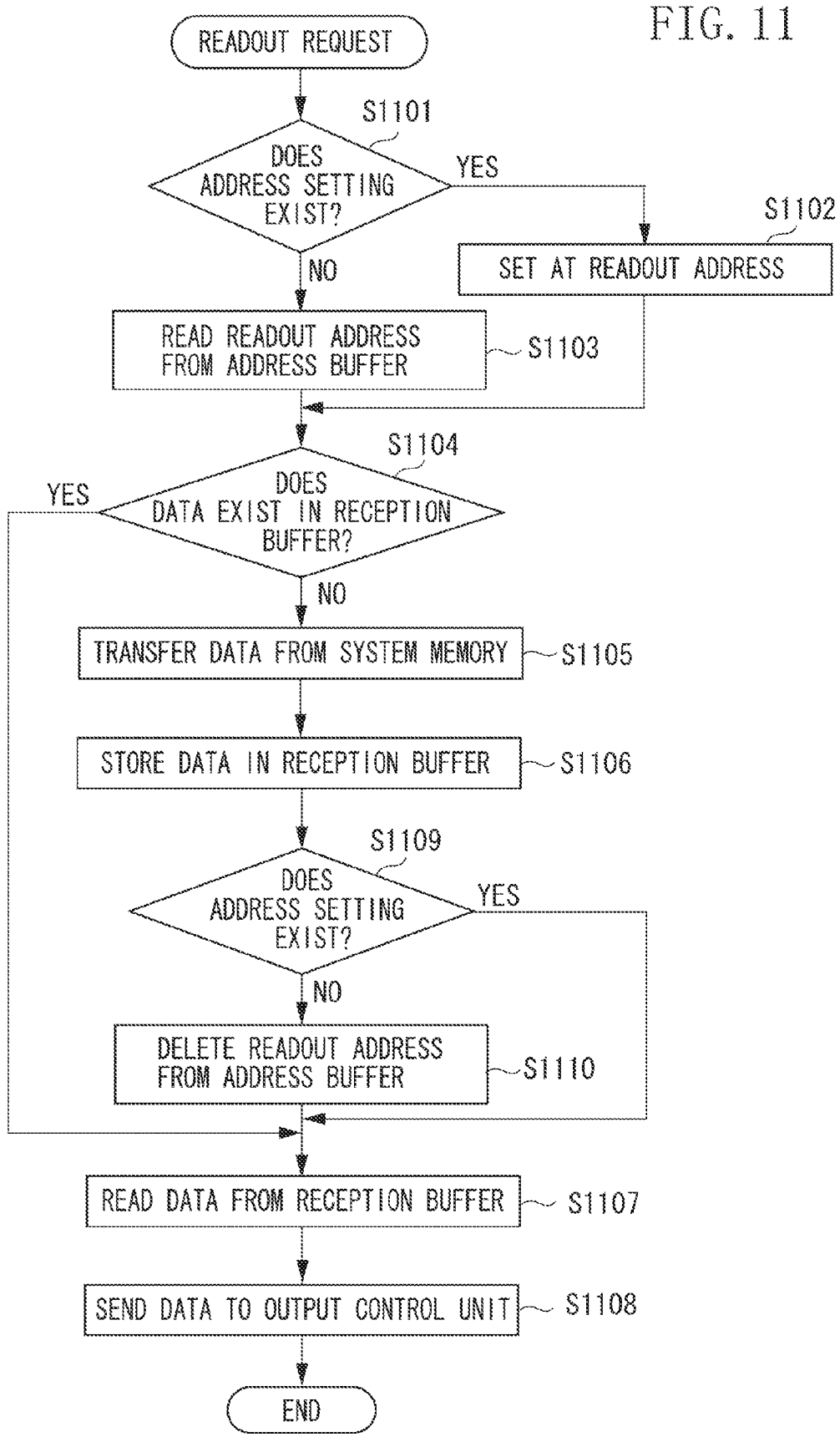
FIG. 11 is a flowchart illustrating an example of a data reception operation from the system memory by the DMA control unit according to the first exemplary embodiment.

Next, a data reception operation from the system memory 203 by the DMA control unit 703 according to the first exemplary embodiment will be described with reference to the flowchart of FIG. 11. FIG. 11 is a flowchart illustrating an example of the data reception operation from the system memory 203 by the DMA control unit 703 according to the first exemplary embodiment. In step S1101, when receiving the readout request (request in step S1003 or step S1008 of FIG. 10) from the output control unit 705, the DMA control unit 703 determines whether address setting for readout by the output control unit 705 exists.

If the DMA control unit 703 determines that the address setting for readout from the output control unit 705 exists (YES in step S1101), then in step S1102, the DMA control unit 703 sets the address set in the aforementioned address setting at the readout address and advances the processing to step S1104.

On the other hand, if the DMA control unit 703 determines that no address setting for readout from the output control unit 705 exists (NO in step S1101), then in step S1103, the DMA control unit 703 reads out the address information when sending the data to the system memory 203 from the address buffer and sets the address information at the readout address, and then, advances the processing to step S1104.

Next, in step S1104, the DMA control unit 703 determines whether data corresponding to the aforementioned readout address has been already read out from the system memory 203 and whether it exists in a reception buffer (not illustrated).

Then, if it is determined that the data corresponding to the readout address already exists in the reception buffer (YES in step S1104), the DMA control unit 703 advances the processing to step S1107. In step S1107, the DMA control unit 703 reads out the data corresponding to the readout address from the reception buffer and, step S1108, sends the read out data to the output control unit 705, and then terminates the processing.

On the other hand, if it is determined that no data corresponding to the aforementioned readout address exists in the reception buffer (NO in step S1104), the DMA control portion 703 advances the processing to step S1105. In step S1105, the DMA control unit 703 reads out the data corresponding to the readout address from the system memory 203 and transfers the data. In step S1106, the DMA control portion 703 stores the transferred data into the reception buffer. Further, in step S1109, the DMA control unit 703 determines whether any address setting for readout from the output control unit 705 exists.

If it is determined that no address setting for readout from the output control unit 705 exists (NO in step S1109), then in step S1110, the DMA control unit 703 deletes the readout address data from the address buffer, and then advances the processing to step S1107.

On the other hand, if it is determined that the address setting for readout from the output control unit 705 exists (YES in step S1109), the DMA control unit 703 advances the processing to step S1107 straight. In step S1107, the output control unit 705 reads out the data transferred from the aforementioned system memory 203 from the reception buffer, and in step S1108, sends the read out data to the output control unit 705, and terminates the processing.

In the image processing apparatus according to the first exemplary embodiment, the DMA control unit 703 in the DMA FIFO buffer acquires a command from a memory having a large latency, and therefore, a processor in the downstream stage does not need to acquire any command from the memory having the large latency. Consequently, the efficiency of the processor pipeline never drops due to an access to the memory having the large latency, thereby eliminating stalls of the processor due to the full storage of the FIFO.

Further, in the image processing apparatus according to the first exemplary embodiment, the identification information (ID information 501) is attached to data to be sent from a processor in the upstream stage, thus enabling the data which does not need to be transferred to a memory to be identified easily. Thus, in the image processing apparatus according to the first exemplary embodiment, the pipeline according to the first exemplary embodiment does not require any complicated processing of comparing the content of data with preliminarily set data not necessary to transfer. As a result, the DMA control unit 703 can be constructed at a low cost.

Therefore, in the image processing apparatus according to the first exemplary embodiment, high-performance data transfer with little deterioration in performance can be achieved at a low cost using a subsystem having a small FIFO capacity for commands to achieve communication between one processor and another processor in the multi-processor configuration. Thus, low-cost and high-performance data transfer between processors can be achieved in the multi-processor pipeline.

Accordingly, the image generation unit 211 of the image processing apparatus according to the first exemplary embodiment can form raster image data by rapid rendering process despite a small-resource processor.

A second exemplary embodiment of the present invention is so configured in addition to the configuration of the first exemplary embodiment, that the input data control unit 701 and the output control unit 705 can communicate with each other. The configuration of second exemplary embodiment will be described below with reference to FIGS. 12, 13, and 14.

Figure 12:
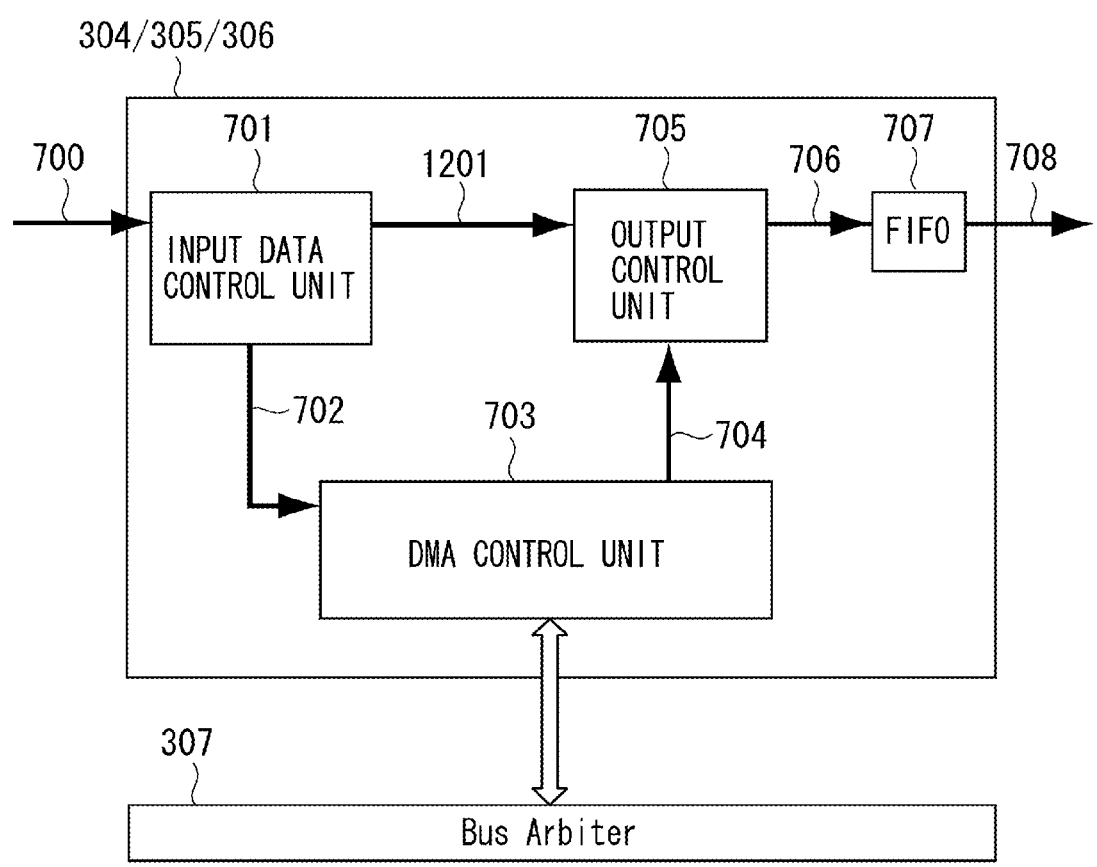
FIG. 12 is a block diagram illustrating the configuration of the DMA FIFO buffer according to a second exemplary embodiment of the present invention.
Figure 13:
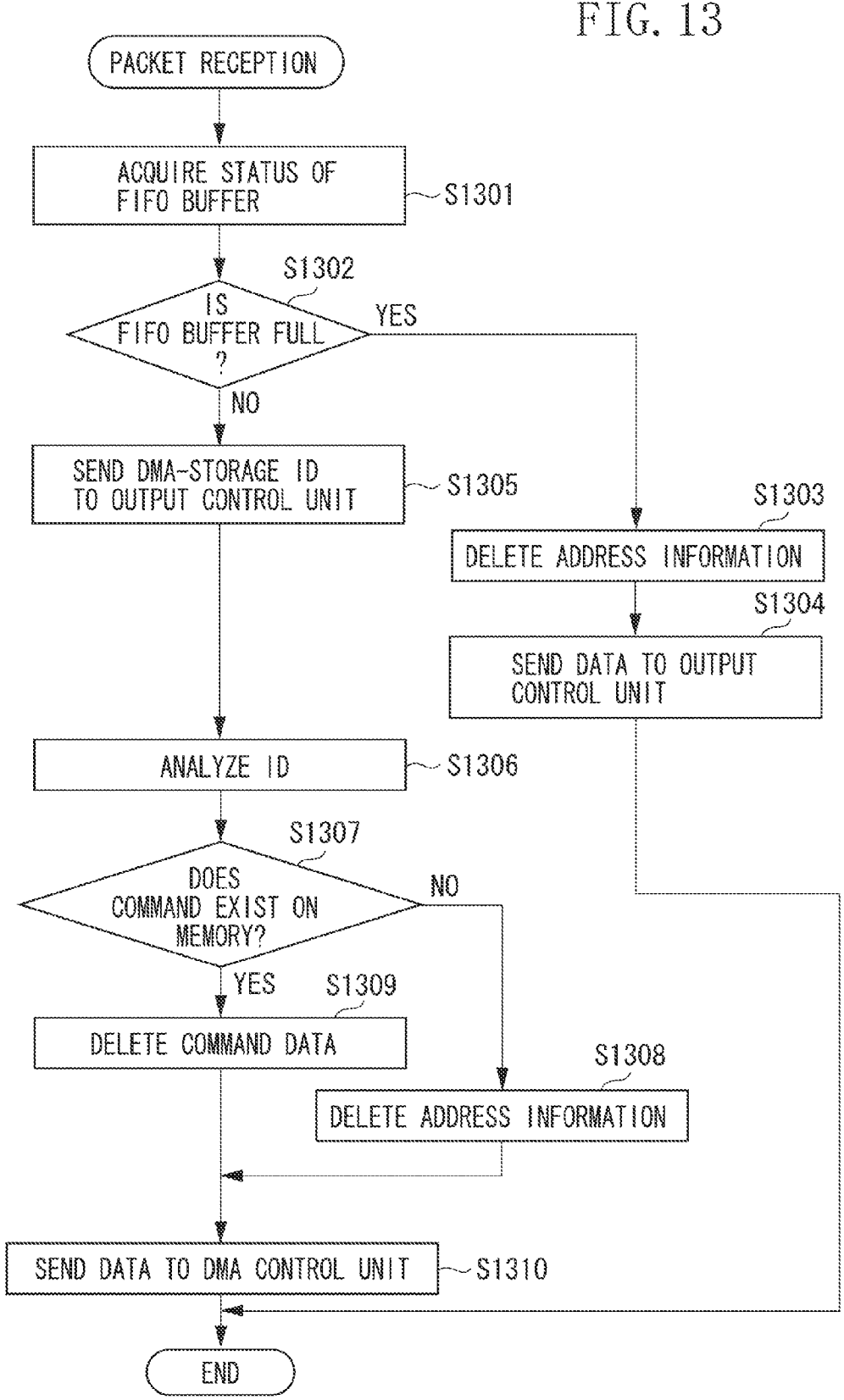
FIG. 13 is a flowchart illustrating an example of the operation of an input data control unit according to the second exemplary embodiment.

FIG. 12 is a block diagram illustrating the configuration of the DMA FIFO buffer according to the second exemplary embodiment of the present invention. The same reference numerals are assigned to the same components as in FIG. 7. Like the first exemplary embodiment, the input data control unit 701 analyzes packet data received from a sub-CPU in the upstream stage via the connection 700 and transfers its data to the output control unit 705 or the DMA control unit 703. The input data control unit 701 is connected to the output control unit 705 via a connection 1201 and to the DMA control unit 703 via the connection 702. An operation of the input data control unit 701 in the second exemplary embodiment is illustrated in FIG. 13.

The output control unit 705 is connected to the FIFO 707 via the connection 706 and to the DMA control unit 703 via the connection 704. An operation of the output control unit 705 of the second exemplary embodiment is illustrated in FIG. 14.

Like the first exemplary embodiment, the FIFO 707 is a buffer which receives data from the output control unit 705 and stores the data in first-in first-out method of outputting first received data first.

Hereinafter, an I/O operation of the DMA FIFO according to the second exemplary embodiment will be described with reference to FIGS. 13 and 14. First, an operation of the input data control unit 701 will be described with reference to the flowchart of FIG. 13. FIG. 13 is a flowchart illustrating an example of the operation of the input data control unit 701 according to the second exemplary embodiment. When receiving packet data 500 from a sub-CPU in the upstream stage, in step S1301, the input data control unit 701 acquires the status of the FIFO 707 from the output control unit 705. When the input data control unit 701 requests the output control unit 705 to acquire the status of the FIFO 707 via the connection 1201, the output control unit 705 sends back information indicating the status of the FIFO 707.

In step S1302, the input data control unit 701 determines whether the FIFO 707 is full depending on the status of the FIFO 707 acquired in step S1301. When it is determined that the FIFO 707 is full (YES in step S1302), then in step S1305, the input data control unit 701 sends DMA storage ID to the output control unit 705. The DMA storage ID is identification information which indicates that the data received from the sub-CPU in the upstream stage is to be sent to the DMA control unit 703 because the FIFO is full.

In steps S1306 to S1310, the input data control unit 701 transfers the data received from the sub-CPU in the upstream stage to the DMA control unit 703 through a similar processing to the first exemplary embodiment (steps S1306 to S1310). A description of the processing of steps S1306 to S1310 is omitted because it is similar to the processing of steps S801 to S805.

On the other hand, if it is determined that the FIFO 707 is not full (NO in step S1302), then in step S1303, the input data control unit 701 deletes the address data 502 in the packet data 500 and, in step S1304, sends the packet data 500 to the output control unit 705. Then, the processing ends.

Next, an operation of the output control unit 705 will be described with reference to the flowchart of FIG. 14. FIG. 14 is a flowchart illustrating an example of an operation of the output control unit 705 according to the second exemplary embodiment. When receiving data (data sent in step S1305 or S1304 of FIG. 13) sent from the input data control unit 701, the output control unit 705 starts the processing of this flowchart.

In step S1401, the output control unit 705 acquires the status of the FIFO 707. In step S1402, the output control unit 705 checks the status of the FIFO 707 and if the FIFO 707 is full (YES in S1402), in step S1401, the output control unit 705 acquires the status of the FIFO again. Even during execution of the processing of this flowchart, when receiving a request for acquisition of the status of the FIFO 707 from the input data control unit 701, the output control unit 705 acquires the status of the FIFO 707 and sends back the status of the FIFO 707 to the input data control unit 701.

On the other hand, if it is determined that the FIFO 707 is not full (NO in step S1402), then in step S1403, the output control unit 705 analyzes the ID information in the data received from the input data control unit 701. By analyzing this ID information, the output control unit 705 determines whether this data is DMA storage ID sent in step S1305 of FIG. 13 or data sent in step S1304.

If it is determined that the data is not the DMA storage ID (NO in step S1404), the input control unit 701 advances the processing to step S1411. In step S1411, the output control unit 705 deletes the ID information from the aforementioned received data and, in step S1413, sends its data (i.e., command data) to the FIFO 707. Then, the processing ends.

On the other hand, if it is determined that the data is the DMA storage ID (YES in step S1404), the input data control unit 701 advances the processing to step S1405. In step S1405, the output control unit 705 sends a readout request to the DMA control unit 703. In response to this request, the DMA control unit 703 sends data existing in the sending buffer (or data which is read out from the system memory 203 after transferred to the system memory 203) to the output control unit 705.

In step S1406, the output control unit 705 waits for data to be received from the DMA control unit 703 (step S1406) and if it is determined that the data has been received from the DMA control unit 703 (YES in step S1406), then in step S1407, the output control unit 705 analyzes the ID information 501 in the received data.

In step S1408, by analyzing the ID information in step S1407, the output control unit 705 determines whether the received data contains the command data 503. If the ID information 501 indicates that the command was generated by the sub-CPU which generated the data, the output control unit 705 determines that the data contains the command data 503. On the other hand, if the ID information 501 indicates that the command is stored in the system memory 203, the output control unit 705 determines that the data contains no command data 503.

Then, if it is determined that the received data contains the command data 503 (YES in step S1408), then in step S1411, the output control unit 705 deletes the ID information from the received data and in step S1412, and sends the command data 503 to the FIFO 707. Then, the processing ends.

On the other hand, if it is determined that the received data contains no command data 503 (that is, contains the address data 502) (NO in step S1408), then in step S1409, the output control unit 705 sets the address data 502 on the DMA control unit 703 and sends a readout request to the DMA control unit 703. In response to this request, the DMA control unit 703 sends data stored at the set address in the system memory 203 to the output control unit 705.

In step S1410, the output control unit 705 waits for the data from the DMA control unit 703 to be received and if it is determined that the data is received from the DMA control unit 703 (YES in step S1410), then in step S1412, the output control unit 705 sends the received data to the FIFO 703. Then, the processing ends.

The DMA control unit 703 executes the same operation as that of the DMA control unit 703 illustrated in the first exemplary embodiment. As described above, the image processing apparatus according to the second exemplary embodiment has a configuration of, if an empty space exists in the FIFO 707, sending a command output from a processor in the upstream stage directly to the FIFO not via the system memory. As a result, deterioration in performance of communication between processors in the multi-processor configuration can be suppressed further.

Although the specific embodiments of the present invention have been described, the present invention may be embodied in the form of, for example, a system, an apparatus, a method, a program, a storage medium, or the like. More specifically, the present invention may be applied to a system constituted of a plurality of apparatuses or an apparatus constituted of a single unit. Additionally, a configuration attained by a combination of the above-described embodiments is included in the scope of the present invention.

Aspects of the present invention can also be realized by a computer of a system or apparatus (or devices such as a CPU or MPU) that reads out and executes a program recorded on a memory device to perform the functions of the above-described embodiment (s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2010-219520 filed Sep. 29, 2010, which is hereby incorporated by reference herein in its entirety.

What is claimed is:

1. An information processing apparatus comprising:
a plurality of processors configured to form a pipeline;
a plurality of communication units configured to transfer communication data between a processor in an upstream stage of the pipeline and a processor in a downstream stage and to temporarily store the communication data output from the processor in the upstream stage to the processor in the downstream stage into an internal FIFO buffer; and
a memory configured to be accessible from each of the processors and each of the communication units,
wherein each of the processors includes a generation unit configured to output, when sending a command to the processor in the downstream stage, communication data including an address of data which exists on the memory and was used for generation of the command, and identification information indicating whether the command exists at the address within the memory,
wherein each of the communication units includes:
a DMA control unit configured to control a DMA access to the memory;
an input unit configured to execute input processing of analyzing the identification information in the communication data input from the processor in the upstream stage and, if it is determined that the command in the communication data does not exist in the memory, deleting the address from the communication data, and, if it is determined that the command in the communication data exists in the memory, deleting the command from the communication data and sending the communication data without the address or the command to the DMA control unit to transfer the communication data to the memory; and
an output control unit configured to execute output processing of, when an empty space occurs in the buffer, acquiring the communication data DMA-transferred to the memory from the memory by the DMA control unit, analyzing the acquired identification information in the communication data, and, if it is determined that a command is contained in the communication data, outputting the command in the communication data to the buffer and, if it is determined that an address is contained in the communication data, acquiring the command from the memory by the DMA control unit using the address in the communication data to output the acquired command to the buffer;
wherein the input control unit is configured to execute processing of, when an empty space exists in the buffer, sending data input from the processor in the upstream stage by deleting the address from the communication data to the output control unit and, when no empty space exists in the buffer, sending identification information indicating DMA-transfer of the communication data to the memory, to the output control unit as well as the input processing, and
wherein the output control unit is configured to analyze, when receiving data from the input control unit, the identification information in the data and, if the identification information is not identification information indicating the DMA-transfer of the communication data to the memory, when an empty space is generated in the buffer, to output the command in the data to the buffer and, if the identification information is identification information indicating the DMA-transfer of the communication data to the memory, to execute the output processing.

2. An inter-processor communication control method for an information processing apparatus including a plurality of processors configured to form a pipeline, a plurality of communication units configured to transfer communication data between a processor in an upstream stage of the pipeline and a processor in a downstream stage and to temporarily store the communication data output from the processor in the upstream stage to the processor in the downstream stage into an internal FIFO buffer, and a memory configured to be accessible from each of the processors and each of the communication units, the inter-processor communication control method comprising:
via each of the processors, when sending a command to the processor in the downstream stage, outputting communication data including an address of data existing on the memory and used for generation of the command, and identification information indicating whether the command exists at the address within the memory;
via an input control unit of each communication unit, executing input processing of analyzing the identification information in the communication data input from the processor in the upstream stage and, if it is determined that the command in the communication data does not exist in the memory, deleting the address from the communication data, and, if it is determined that the command in the communication data exists in the memory, deleting the command from the communication data and sending the communication data without the address or the command to the memory by a DMA control unit; and
via an output control unit of each communication unit, executing output processing of, when an empty space occurs in the buffer, acquiring the communication data DMA-transferred to the memory from the memory by the DMA control unit, analyzing the acquired identification information in the communication data, and, if it is determined that a command is contained in the communication data, outputting the command in the communication data to the buffer and, if it is determined that an address is contained in the communication data, acquiring the command from the memory by the DMA control unit using the address in the communication data to output the acquired command to the buffer;
via the input control unit, executing processing of, when an empty space exists in the buffer, sending data input from the processor in the upstream stage by deleting the address from the communication data to the output control unit and, when no empty space exist in the buffer, sending identification information indication DMA-transfer of the communication data to the memory, to the output control unit as well as the input processing; and
via the output control unit, when receiving data from the input control unit, analyzing the identification information in the data and, if the identification information is not identification information indicating the DMA-transfer of the communication data to the memory, when an empty space is generated in the buffer, outputting the command in the data to the buffer and if the identification information is identification information indicating the DMA-transfer of the communication data to the memory, executing the output processing.

* * * * *